United States Patent [19]

Skrycki

[11] 4,121,846
[45] Oct. 24, 1978

[54] GASKET ASSEMBLY
[75] Inventor: Robert R. Skrycki, Grosse Ile, Mich.
[73] Assignee: McCord Corporation, Detroit, Mich.
[21] Appl. No.: 535,034
[22] Filed: Dec. 20, 1974
[51] Int. Cl.$^2$ .................................................. F16J 15/06
[52] U.S. Cl. ................................. 277/235 R; 277/235 B
[58] Field of Search ............... 277/235 B, 180, 235 R, 277/235 A, 166; 123/41.83, 41.84

[56] References Cited

U.S. PATENT DOCUMENTS

| | | | |
|---|---|---|---|
| 3,053,544 | 9/1962 | Gorsica | 277/166 |
| 3,363,608 | 1/1968 | Scherenberg et al. | 123/41.84 |
| 3,519,281 | 7/1970 | Tencher | 277/235 B |
| 3,542,382 | 11/1970 | Hagmann | 277/180 |
| 3,560,007 | 2/1971 | Ascenio | 277/180 |
| 3,721,452 | 3/1970 | Black | 277/211 |

OTHER PUBLICATIONS

Roth, "Vacuum Sealing Techniques" (Pergamon Press — 1966), pp. 422–425.

*Primary Examiner*—Richard E. Aegerter
*Assistant Examiner*—L. Footland
*Attorney, Agent, or Firm*—McGlynn and Milton

[57] ABSTRACT

A gasket assembly including a metal core member having spaced parallel first and second faces with an annular cylinder bore opening therein. The core member includes an offset portion extending about the periphery of the opening. The offset portion has a first surface raised above one face of the core member and a second surface recessed below the other face of the core member. The offset portion is integrally formed with the remainder of the core member and is connected thereto through sections which have shear stresses therein. In one embodiment a U-shaped shell member is disposed about the core member and the offset portion therein and layers of compressible paper-like material are disposed on opposite sides of the core member extending from the U-shaped shell member. In another embodiment an annular skirt is integral with and extends perpendicularly from one leg of the U-shaped shell member. The shear stresses in the core member at the extremities of the offset portion provide compressive strengths heretofore unobtainable.

8 Claims, 4 Drawing Figures

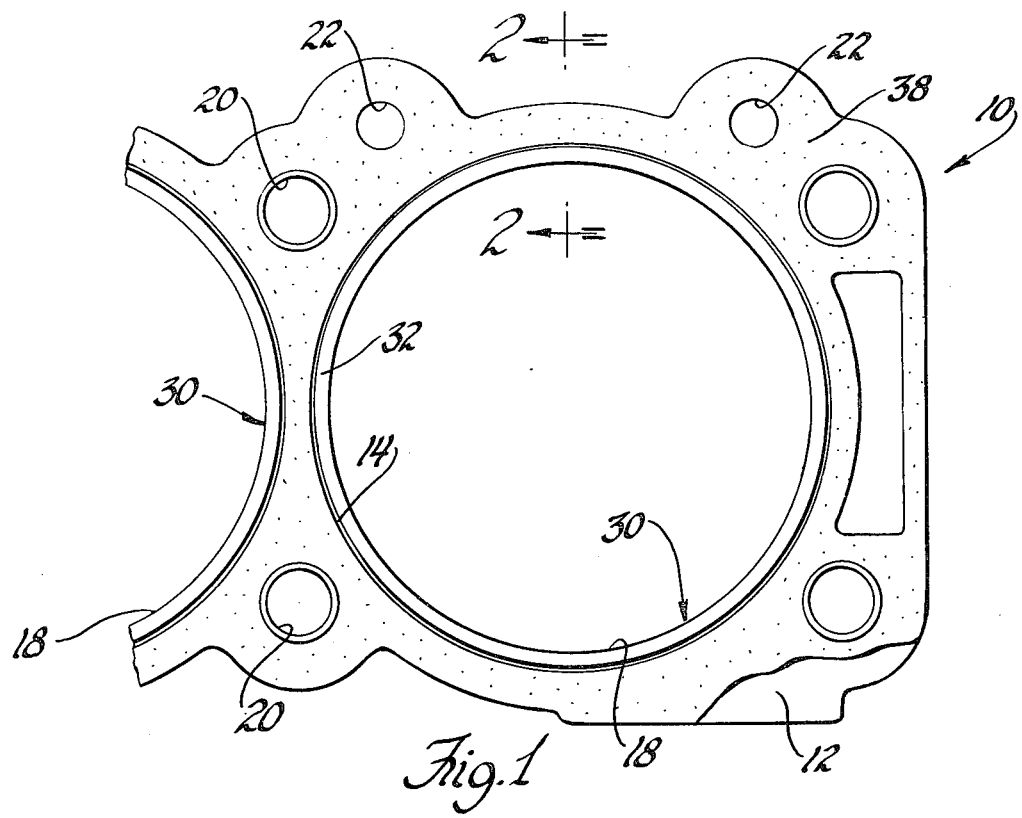
Fig. 1
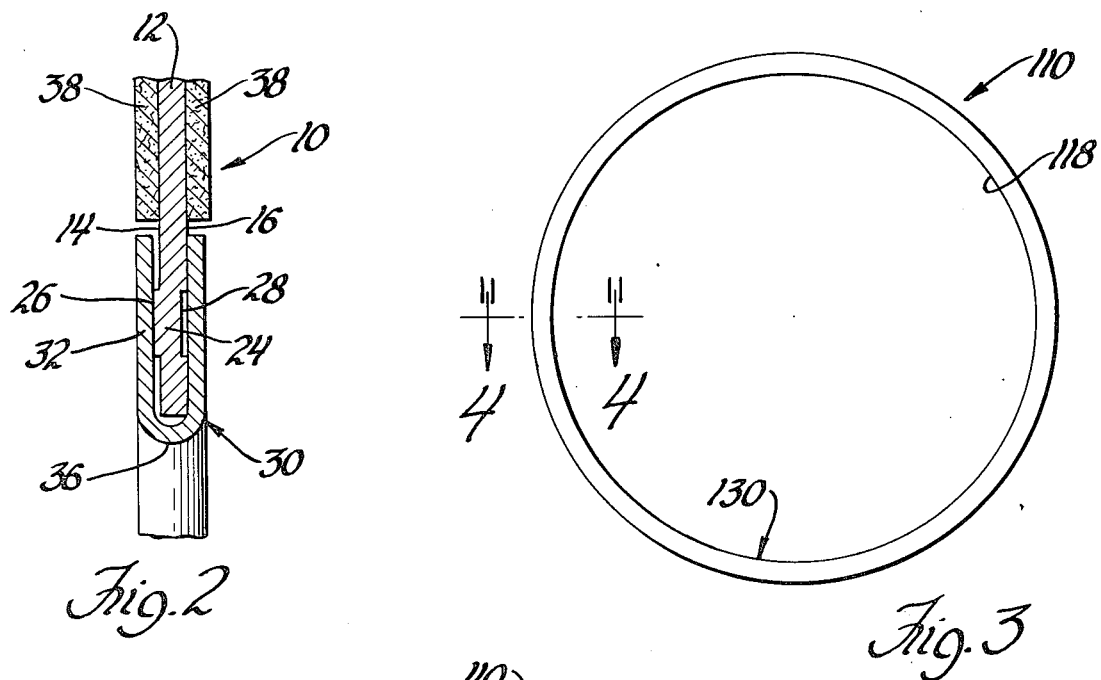
Fig. 2
Fig. 3
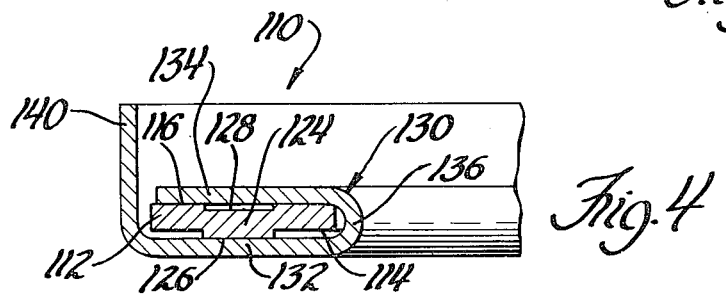
Fig. 4

GASKET ASSEMBLY

This invention relates to a gasket assembly of the type utilized between the block and head of an internal combustion engine. Such gaskets frequently include a metal core with an opening therein to accommodate the cylinder bore. A bead or raised portion is normally disposed about the periphery of the opening to be deformed to acccommodate tolerances between the cylinder head and the cylinder block about the periphery of the cylinder bore or, alternatively, between the cylinder head and the top of a cylinder liner. Such beads have been formed by bending the metal core of the gasket and frequently such sections do not provide the requisite strength and are easily deformed as the cylinder head is torqued, thus frequently resulting in leakage.

In accordance with the instant invention, an offset portion is included in the metal core to extend about the periphery of the cylinder opening therein and is integral with the metal core through a section which has shear stresses therein whereby the forces required to move the offset portion back into alignment with the remainder of the core element is substantially greater than in the prior art assemblies.

Other advantages of the present invention will be readily appreciated as the same becomes better understood by reference to the following detailed description when considered in connection with the accompanying drawings wherein:

FIG. 1 is a fragmentary plan view of a preferred embodiment of a gasket assembly constructed in accordance with the subject invention;

FIG. 2 is an enlarged fragmentary cross-sectional view taken substantially along line 2—2 of FIG. 1;

FIG. 3 is a plan view of another embodiment of a gasket assembly constructed in accordance with the subject invention; and FIG. 4 is an enlarged fragmentary cross-sectional view taken substantially along line 4—4 of FIG. 3.

A first embodiment of a gasket assembly constructed in accordance with the subject invention is generally shown at 10 in FIGS. 1 and 2 and a second embodiment of a gasket assembly constructed in accordance with the subject invention is generally shown at 110 in FIGS. 3 and 4.

The gasket assembly 10 includes a metal core member 12. The core member 12 is a flat piece of flexible sheet metal having spaced parallel first and second faces 14 and 16. The core member 12 includes a plurality of cylinder openings 18. Also included are a plurality of coolant openings 22 and bolt holes 20.

The core member 12 includes an annular offset portion 24 (as viewed in croos section) extending annularly about the periphery of each opening 18. The offset portion includes a first surface 26 raised above the first face 14 of the core member 12 and a second surface 28 recessed below the second face 16 of the core member 12. The offset portion 24 is integrally formed with the remainder of the core member 12 and is connected thereto through a section at each of the opposite extremities thereof, each of which has shear stresses therein. Said another way, the faces 14 and 16 of the core member extend in both directions from the offset portion 24 so that there are two sections having shear stresses therein along the opposite extremities of the offset portion as viewed in cross section. The annular offset portion 24 is formed in the metal core member 12 by a piercing or shearing operation to establish shear stressess in the circular sections interconnecting the offset portion 24 and the adjacent remaining portions of the core member 12. Such shear forces or stresses result from forces applied to cause the continuous parts of the core member 12 to slide relatively to each other parallel to the plane of contact between the offset portion and the remainder of the core member 12.

The assembly 10 also includes an annular shell member generally indicated at 30. The annular shell member 30 has a U-shaped configuration as viewed in cross section with a first leg 32 engaging the first surface 26 of the offset portion 24 and a second leg 34 engaging the second face 16 of the core member 12. The legs 32 and 34 are interconnected by a semicircular base portion 36. The legs 32 and 34 are parallel to one another and extend radially outwardly from the opening 18 and are of equal length. The core member 12 extends from the legs 32 and 34 of the shell member 30 and layers 38 of compressible paper-like material are disposed on each of the faces 14 and 16 of the core member 12 and extend from a position immediately adjacent the terminal ends of the legs 32 and 34 of the shell member 30.

The core member 112 of the gasket assembly 110 includes spaced paralledl first and second faces 114 and 116 with an annular offset portion 124. The core member 112 is an annular disc-like member having the offset portion 124 disposed therein to extend about a cylinder opening 118. The offset portion 124 is the same as the offset portion 24 in that it has a first surface 126 raised above the face 114 and a second surface 128 recessed below the face 116. The offset portion 124 is formed integrally with the remainder of the core member 112 and is connected thereto through circular sections which have shear stresses therein, the same as the shear stresses described above in connection with the offset portion 24.

The assembly 110 includes an annular shell member generally indicated at 130 having a U-shaped configuration as viewed in cross section with a first leg 132 engaging the first surface 126 of the offset portion and a second leg 134 engaging the face 116 of the core 112. The legs 132 and 134 are interconnected by a semicircular base portion 136 and extend parallel to one another radially outwardly from the center of the opening 118.

The shell member 130 includes an annular skirt 140 extending from and perpendicular to the distal end of the leg 132. The skirt 140 is disposed radially outwardly of the core member 112 and the shell member 130.

The gasket assembly 110 is utilized with an engine which includes a cylinder liner with a space between the cylinder liner and the adjacent cylinder block. The skirt 140 is disposed in the space between the liner and cylinder block with the leg 134 of the shell member 130 resting atop the cylinder liner. When the head is placed in position it engages the leg 132 of the shell member 130 and the offset portion 124 receives the clamping forces between the cylinder head and the top of the cylinder liner.

The offset portions 24 and 124 are integrally connected with the remainder of the respective core members by sections which are placed in shear and have shear stresses therein, as explained above. Such shear stresses increase the load which the gasket can take and increases the force necessary to move the off-set portions 24 and 124 back into alignment with the remainder of the respective core members. The gasket assembly constructed in accordance with the instant invention, therefore, more satisfactorily accounts for variances in tolerances to establish more consistent sealing than the prior art gaskets.

The embodiments of the invention in which an exclusive property or privilege is claimed are defined as follows:

1. A preformed gasket assembly for sealing between two planar surfaces comprising; a metal core member having spaced parallel first and second faces and an opening therein, said core member having an offset portion extending about the periphery of said opening, said offset portion having a first surface raised above said first face and a second surface recessed below said second face, said offset portion being integrally formed with the remainder of said core member and connected thereto through a planar section having shear stresses therein and extending between and transversely to said first and second surfaces of said offset portion so that said gasket assembly may be clamped between two planar sealing surfaces with the clamping forces extending through said planar section whereby the shear stresses respond to the clamping force.

2. An assembly as set forth in claim 1 including an annular shell member having a U-shaped configuration as viewed in cross section with a first leg thereof engaging said first surface of said offset portion and a second leg thereof engaging said second face of said core member.

3. An assembly as set forth in claim 2 wherein said legs of said shell member are generally parallel and extend outwardly from said opening.

4. An assembly as set forth in claim 3 wherein said faces of said core member extend from opposite extremities of said offset portion and including one of said sections having shear stresses therein at each of said extremities.

5. An assembly as set forth in claim 4 wherein said core member extends from said legs of said shell member.

6. An assembly as set forth in claim 5 including a layer of compressible material on each of said faces of said core member adjacent said shell member.

7. An assembly as set forth in claim 4 wherein said shell member includes a skirt extending from and perpendicular to the distal end of one of said legs.

8. A sealed assembly comprising: two spaced planar sealing surfaces; a gasket assembly including a metal core member having spaced parallel first and second faces, said core member having an offset portion with a first surface raised above said first face and a second surface recessed below said second face, said offset portion being integrally formed with the remainder of said core member and connected thereto through a planar section having shear stresses therein and extending between and transversely to said first and second surfaces of said offset portion, said planar section extending transversely to and being clamped between said sealing surfaces so that the clamping forces extend through said planar section perpendicularly to said first and second surfaces.

* * * * *